United States Patent
Creemer et al.

(10) Patent No.: US 6,965,765 B2
(45) Date of Patent: Nov. 15, 2005

(54) TRANSACTIONAL MESSAGE-QUEUE COMMUNICATION FOR WIRELESSLY NETWORKED DEVICES SYSTEM AND METHOD

(75) Inventors: David Z. Creemer, Palo Alto, CA (US); Steven C. Lemke, Sunnyvale, CA (US)

(73) Assignee: PalmSource, Inc., Sunnyvale, CA (US)

( * ) Notice: Subject to any disclaimer, the term of this patent is extended or adjusted under 35 U.S.C. 154(b) by 508 days.

(21) Appl. No.: 09/861,064

(22) Filed: May 17, 2001

(65) Prior Publication Data

US 2002/0173293 A1 Nov. 21, 2002

(51) Int. Cl.[7] .......................... H04M 11/10; H04Q 7/20
(52) U.S. Cl. ....................... 455/412; 455/413; 455/414; 455/417; 455/41; 455/67.3; 455/422; 455/436
(58) Field of Search ............................... 455/412, 413, 455/414, 417, 67.3, 41, 422, 436; 709/203, 245, 219, 227, 230, 231, 232

(56) References Cited

U.S. PATENT DOCUMENTS

| | | | |
|---|---|---|---|
| 5,262,942 A | * 11/1993 | Earle | ........................... 705/37 |
| 5,754,774 A | * 5/1998 | Bittinger et al. | ............. 709/203 |
| 5,960,178 A | 9/1999 | Cochinwala et al. | ... 395/200.62 |
| 6,115,365 A | 9/2000 | Newberg et al. | ............. 370/312 |
| 6,161,198 A | 12/2000 | Hill et al. | ....................... 714/15 |
| 6,170,003 B1 | 1/2001 | Benkual et al. | .............. 709/214 |
| 6,182,120 B1 | 1/2001 | Beaulieu et al. | ............. 709/207 |
| 6,182,252 B1 | 1/2001 | Wong et al. | ................. 714/708 |
| 6,216,151 B1 | * 4/2001 | Antoun | ........................ 709/203 |
| 6,226,689 B1 | 5/2001 | Shah et al. | .................. 709/314 |
| 6,246,691 B1 | 6/2001 | Briem et al. | ................. 370/412 |
| 6,249,807 B1 | 6/2001 | Shaw et al. | .................. 709/206 |
| 6,279,041 B1 | 8/2001 | Baber et al. | ................. 709/232 |
| 6,405,123 B1 | * 6/2002 | Rennard et al. | ............. 701/200 |
| 2003/0120811 A1 | * 6/2003 | Hanson et al. | |

* cited by examiner

*Primary Examiner*—Allan Hoosain
(74) *Attorney, Agent, or Firm*—Foley & Lardner LLP

(57) ABSTRACT

A method and system for communicating with a communications network using message-queues is disclosed. The method includes establishing a wireless link from a mobile device. The method also includes retrieving a request from the mobile device, the request including a server address. The method further includes sending the request over a communications network to the server corresponding to the server address. Further still, the method includes retrieving information from the server corresponding to the server address. Yet further still, the method includes placing the information from the server corresponding to the server address into a queue corresponding to a mobile device. Still yet further, the method includes awaiting a wireless link to the mobile device and sending the information from the queue over the wireless link to the mobile device.

25 Claims, 3 Drawing Sheets

TRANSACTIONAL MESSAGE-QUEUE COMMUNICATION FOR WIRELESSLY NETWORKED DEVICES SYSTEM AND METHOD

FIELD OF THE INVENTION

The present specification relates to a system and method for communicating using a wirelessly connected communications device to connect with a distributed communications network. In particular, the present specification relates to a system and method for communicating with a distributed communications network using message-queue middleware. Further, the present specification relates to a communications system that uses an electronic device which is configured to receive and send wireless communication signals to a message-queue middleware server the server being configured to communicate with a communications network.

BACKGROUND OF THE INVENTION

The internet includes a distributed communications network linking a vast number of computers with smaller computers, computer networks and wireless devices. The computers coupled to these networks exchange information using various services, such as electronic mail and the world wide web (WWW). The world wide web allows a computer server (sometimes referred to as a web server or a web site) to send graphical web page information to a remote client computer system. The remote client computer system is configured to display the web page information in a graphical format.

Resources, such as individual computers or individual web pages on the world wide web may be uniquely identified by a uniform resource locator (URL). For a user to view a specific web page, a client computer system specifies the URL for that web page in a request, such as a hypertext transfer protocol (HTTP) request. The request is forwarded through the communications network to the web server that supports the particular web page. The web server responds to the request by sending the particular web page to the requesting client computer system. When the requesting client computer system receives the particular web page, the particular web page is displayed on a video display using a browser. The browser is typically a special-purpose application program that effects the requesting of web pages and the supplying of web pages.

The web pages themselves are typically defined using a hypertext mark-up language (HTML). HTML simply provides a standard set of tags that define how a web page is to be displayed. When a user indicates to the browser to display a web page, the browser sends a request to the server computer to transfer to the client computer system an HTML document that defines the web page. When the requested HTML document is received by the client computer system, the browser displays the web page as defined by the HTML document. The HTML document contains various tags that control the displaying of text graphics, controls, and other features. The HTML document may further contain URLs of other web pages or other documents or other types of content, such as, but not limited to, audio and video content, available on that server computer system or other server computer systems. These URLs are often referred to as links. Each of these links may be selected by the HTML document user and an HTTP request is sent to the associated web server.

Although the origins of the internet arose from the need for an exchange of scientific and engineering information between scientists and engineers, the internet has become especially conducive to conducting electronic commerce (e-commerce), searching for information by individuals for both personal and professional use, and for managing and facilitating day-to-day activities by individuals in a personal and professional context, as well as for providing other productivity services.

It has become increasingly desired that individuals be able to gain access to the resources and content available over the internet while using any of a variety of mobile devices, including, but not limited to, mobile computers, mobile messaging devices, cellular telephones, personal digital assistants, and handheld computers. With increased demands being put on these devices, users increasingly demand access to content, services, and resources available over the internet that would conventionally be available to a personal computer user as well, for example.

Typically, for example, in the world wide web environment, a user may be using a web browser interface and provide a desired URL as input to the browser. The browser issues a request to a server and the server returns a response. This type of communications session is an example of a synchronous communications session wherein the browser opens a communications session, provides data during the open communications session and awaits a response while the communications session remains open. The web server receiving the request sends a response and there may be several request/response pairs within the single session. All the while, the communications session remains open. This type of synchronous communications appears to work well for devices hardwired to a network either over a modem or connected to a local area network which is in turn connected to a larger wide area wired network or the like. Such systems have proven to be very reliable, in fact, transmission control protocol/internet protocol (TCP/IP) implements reliability in the protocol such that lost packets may be regenerated and reassembled. TCP/IP has been implemented on wireless devices. However, TCP/IP does not appear to be wholly efficient because the wireless communications channel may be extremely unreliable and TCP/IP was designed for point to point connections that are generally reliable. Wireless TCP/IP networks may be reliable when used in certain areas. However, when a wireless device is being transported, such as during driving and the device is obstructed from coverage by a hill or building, for example, or there are too many people making calls simultaneously and service has dropped, the communications channel is interrupted. Accordingly, on-line web based applications using synchronous communications protocols are not generally applicable to communications over wireless networks.

Thus, there is a need for a method of communicating wirelessly with a communications network using a more reliable communications technique and/or protocol. Further, there is a need for a system that enables reliable wireless communications between a mobile device and a communications network. There is also a need for a system and method utilizing message-queue middleware in which messages from a computer server are queued and await transmission to an associated mobile device. There is further a need for a system and method which utilizes a communications queue on the mobile device, whereby messages or packets in the communications queue await connection to a communications network prior to transmission.

The techniques herein below extend to those embodiments which fall within the scope of the appended claims, regardless of whether they accomplish one or more of the above-mentioned needs.

SUMMARY OF THE INVENTION

An exemplary embodiment relates to a method of communicating with a communications network using message-queue middleware. The method includes establishing a wireless link from a mobile device. The method also includes retrieving a request from the mobile device, the request including a server address. Further, the method includes sending the request over a communications network to the server corresponding to the server address. Further still, the method includes retrieving information from the server corresponding to the server address. Yet further still, the method includes placing the information from the server corresponding to the server address into a queue corresponding to the mobile device. Yet still further, the method includes awaiting a wireless link to the mobile device and sending the information from the queue over the wireless link to the mobile device.

Another exemplary embodiment relates to a communications system. The communications system includes an electronic device configured to send and receive wireless communications signals. The communications system also includes a message-queue server configured to communicate over a wireless link with the electronic device. Further, the communications system includes a communications network in communication with the message-queue server. The message-queue server is configured to maintain the message-queue associated with the electronic device and is further configured to communicate information from the message-queue over the wireless link during periods in which the wireless link is available.

Another exemplary embodiment relates to a method of communicating with a communications network using a wireless communications device. The method includes establishing a wireless communications link with a message-queue server. The method also includes providing a request from a message queue maintained on the wireless communications device over the wireless communications link to the message-queue server. Further, the method includes re-establishing a wireless communications link with the message-queue server. Further still, the method includes receiving a response over the re-established wireless communications link to the request from a message-queue on the message-queue server.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
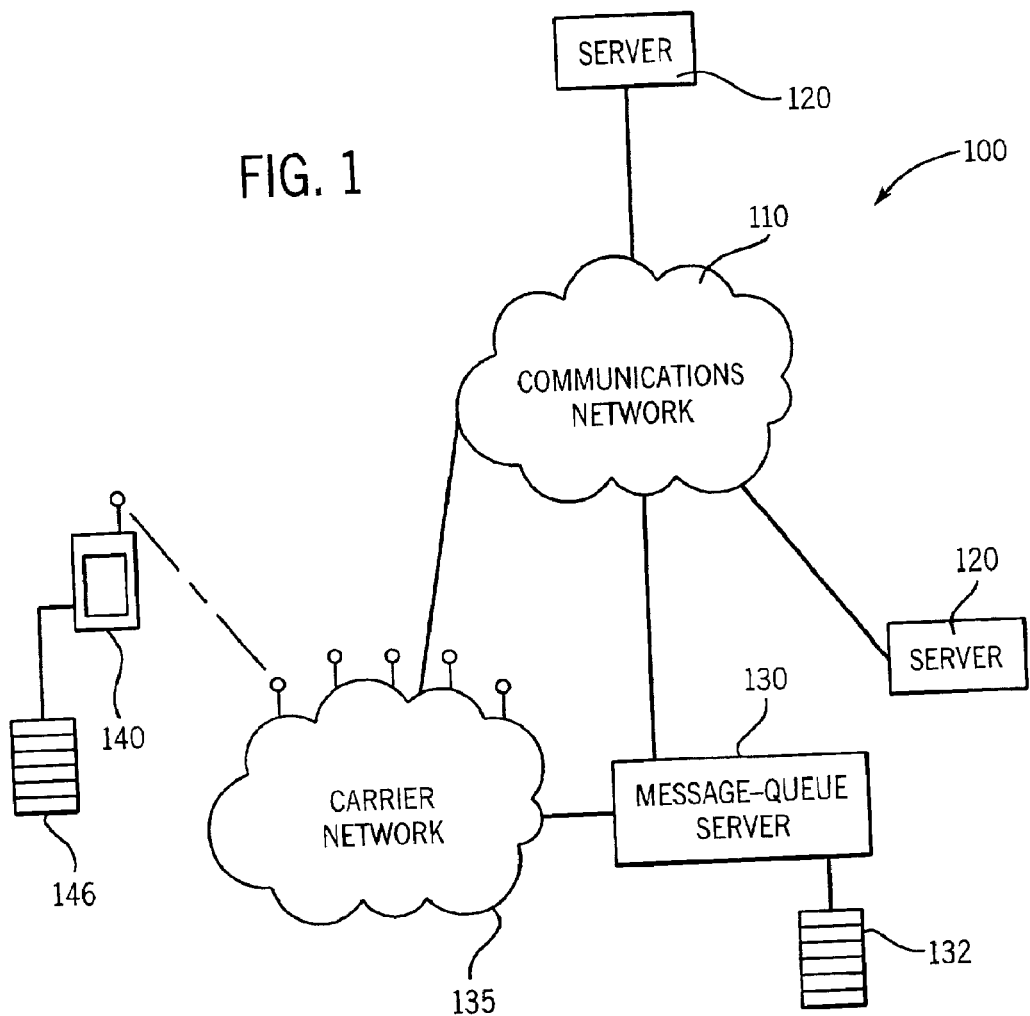
FIG. 1 is a block diagram of a communications network and a handheld computer connected wirelessly thereto.

Referring to FIG. 1, a communications system 100 is depicted. Communications system 100 includes the internet or any other type of communications network 110. In the exemplary embodiment depicted, communications network 110 is a widely distributed communications system in which a plurality of server and client computers are coupled in communication with a plurality of other server and client computers widely distributed. For example, server computers may include server computers 120 and further may include a message-queue middleware server 130. Communications network 110 may also be coupled to a carrier network 135 which provides wireless services to mobile electronic devices.

In an exemplary embodiment, server computers may further include such servers as wireless servers, content sources, web portal servers, third party content servers, and many other types of server computers having a variety of functions and resources. In the exemplary embodiment depicted in FIG. 1, carrier network 135 services a plurality of handheld computers or other wireless devices such as handheld computer 140. Handheld computer 140 may be any of a variety of mobile electronic devices including, but not limited to, handheld computers, personal digital assistants, palmhelds, palmtop computers, cellular telephones, wireless pagers, wireless messaging devices, laptop computers, and the like. Handheld computer 140 is configured to communicate wirelessly with carrier network 135 and gain access to resources over communications network 110 through message-queue middleware server 130. For example, a user utilizing a software application running on handheld computer 140 may wish to share data with or provide a request to server 120, accessible over communications network 110. Handheld computer 140 is configured to place such data or request in a queue 146 on handheld computer 140. Because the communications link with carrier network 135 is a wireless link, the link may be unsatisfactorily noisy or may be unavailable because of lack of coverage, or too much traffic. Accordingly, messages in queue 146 await transfer to server 120 (via carrier network 135 and message-queue server 130) until the wireless connection becomes clear, or the wireless connection is re-established. Similarly, responses from server 120 will be communicated over communications network 110 to message-queue server 130. Such responses will be placed in queue 132, that is particularly associated with handheld computer 140, to await transfer until such a time that the wireless link between carrier network 135 and handheld computer 140 becomes clear or is re-established. In an alternative exemplary embodiment, handheld computer 140 may connect directly with message-queue middleware server 130 as opposed to being connected through a separate carrier network.

During an exemplary usage of a software application (productivity application or any other type of software application) running on handheld computer 140, a user utilizing handheld computer 140 often wishes to provide information to, view documents from, or use applications or services communicated over communications network 110 from, sources such as servers 120. Accordingly, a user utilizing a software application running on handheld computer 140 would provide such a request by communicating an address, such as, but not limited to, a URL, and a function, such as download information, request information, and the like. Such a request would be placed in a communications queue 146 on handheld computer 140. Queue 146 is configured to contain a plurality of outgoing packets, messages, and the like. When a communications link with carrier network 135 and message-queue server 130 is established, messages in queue 135, awaiting transmission, are in turn communicated over the wireless link to carrier network 135 and subsequently to message-queue server 130. Message-queue server 130 associates the received message with handheld computer 140 and submits the request to the appropriate server 120 over communications network 110. Message-queue server 130 retrieves the requested information and places the requested information (in a single or multiple packets) into a queue 132, queue 132 being particularly associated with handheld computer 140. When handheld computer 140 is in communication with carrier network 135, message-queue server 130 begins emptying message-queue 132 to handheld computer 140 via carrier network 135. Similarly, handheld computer 140 will empty its queue 142 while communications with carrier network 140 are established. Messages from queue 142 will be delivered to message-queue server 130 over carrier network 135.

Figure 2:
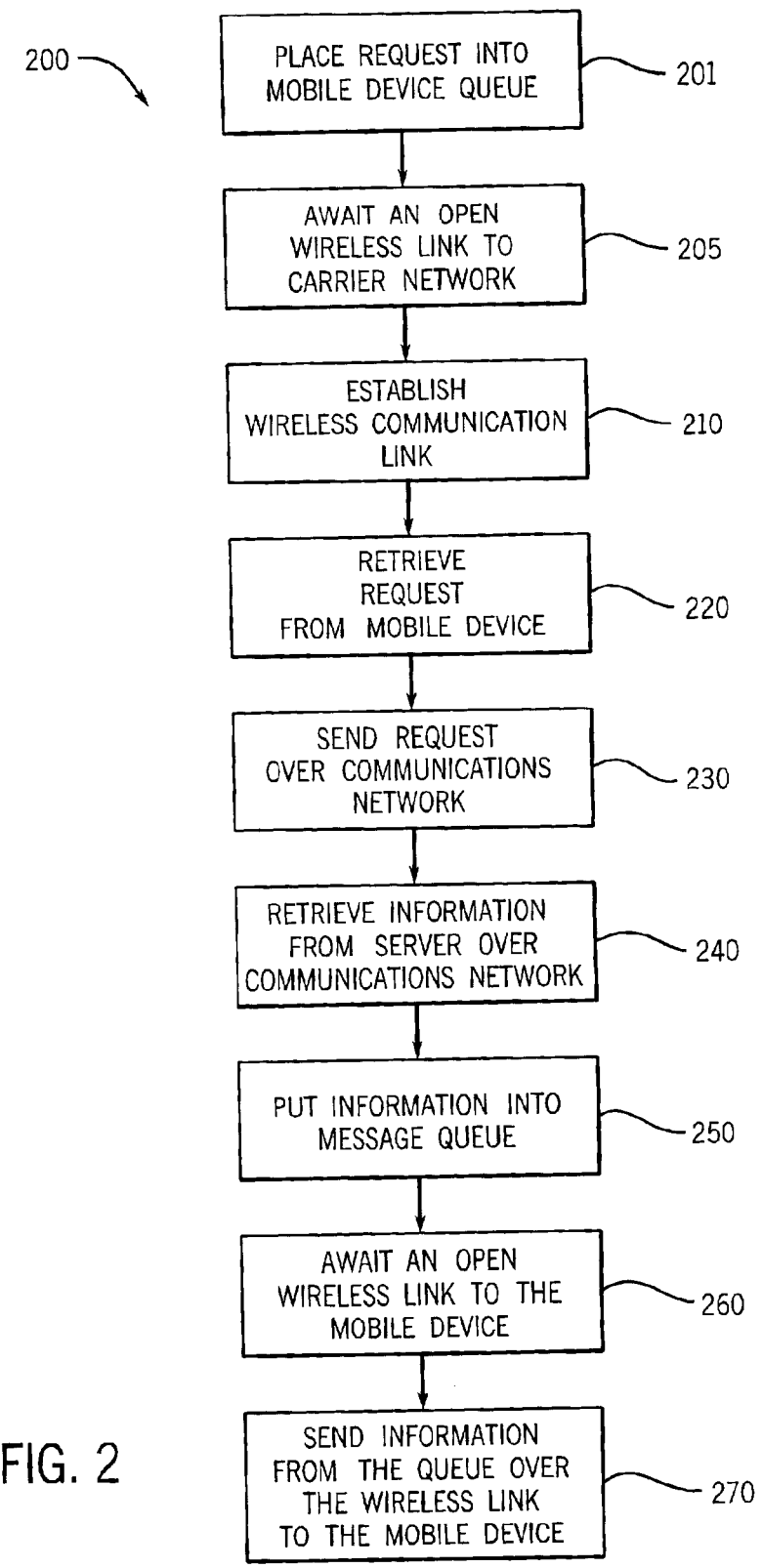
FIG. 2 is a flow diagram depicting steps of communicating with a communications network using message-queue middleware.

Such communications may be carried out in a plurality of steps 200 (FIG. 2). A request or message may be placed in queue 146 (step 202) and an open wireless link to carrier network 135 is awaited. Communications are then carried out after a wireless communications link is established (step 210). The message-queue middleware server 130 retrieves the request from handheld computer 140 (step 220) as queue 146 of handheld computer 140 is emptied. In an exemplary embodiment, the request may include not only an address and a function, but may also include data to be transmitted to a server 120 and optionally, quality of service information.

Quality of service information may include a time-to-live quality of service, a best effort quality of service, or others. There may be a cost associated with each type of quality of service. Time-to-live quality of service implies providing a best effort to provide the communications over the wireless link. However, if the communications are not completed in a certain amount of time, the message to be communicated over the wireless link is deleted from the queue. Further, a best-effort quality of service implies that communications of the message will be attempted until otherwise repealed or deleted from the queue for other reasons.

Once a request has been received by message-queue middleware server 130, it is sent over communications network 110 to the appropriate server 120 associated with the address in the request (step 230). The information requested is then retrieved from the appropriate server 120 over communications network 110 (step 240). Once the information has been retrieved, the information is put into the message-queue either in a multiplicity of packets, or in a single message packet (step 250). The message-queue middleware server then holds the message or messages in a queue awaiting an open wireless link to the mobile device 140 for communicating the information thereto (step 260). Once an open wireless link to handheld computer 140 has been established or re-established, messages from the message-queue particularly associated with handheld computer 140 are communicated to handheld computer 140 over the wireless link (step 270). This form of communications is often referred to as asynchronous communications in which the communications session is not held open, rather the communications session may be closed and re-established and picked up where left off.

Figure 3:
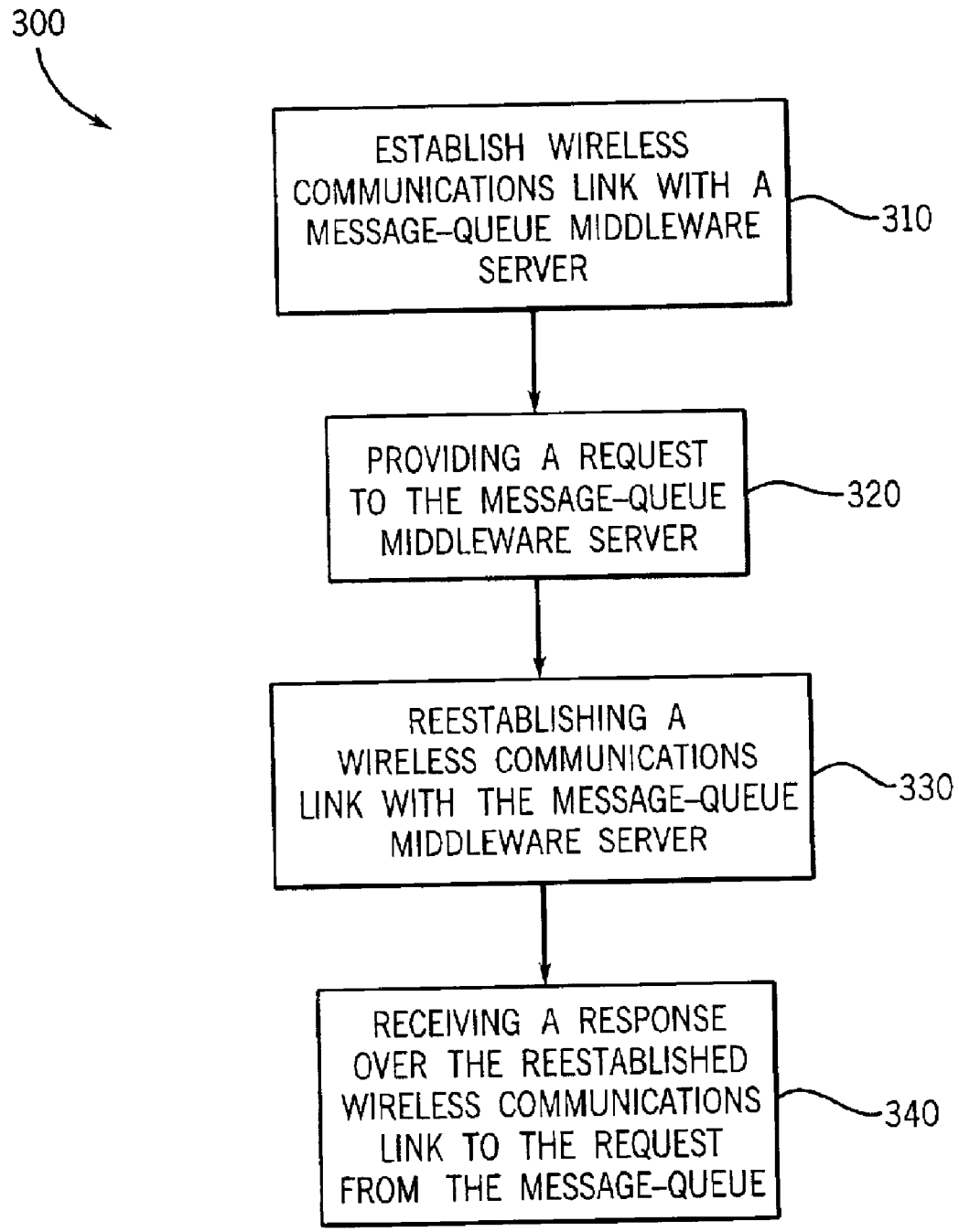
FIG. 3 is a flow diagram depicting steps of communicating with a communications network using a wireless communications device.

In another exemplary embodiment, a plurality of steps 300, depicted in FIG. 3, may be used to retrieve data over a wireless communications link from a communications network 110 by a handheld computer 140. For example, a wireless communications link with a message-queue middleware server is established (step 310). Once the link has been established, a request is provided to the message-queue middleware server over the wireless link. The request may be the next in line message from queue 146 of handheld computer 140. The request includes at least an address and a function, but possibly includes other types of information such as, but not limited to data and quality of service information (step 320). Once the request has been provided to the message-queue middleware server, the message-queue middleware server transmits such a request to the appropriate server over communications network 110. The server receiving the request then provides information back over communications network 110 to message-queue middleware server 130. Message-queue middleware server 130 packages the information in a format to be sent over the wireless link and places such packetized information into a queue associated with handheld computer 140. Handheld computer 140 may have a wireless communications link already open or may re-establish such a wireless communications link at any time (step 330). Once the communications link is established or has been re-established, a response is received over the wireless link, the response being a response to the original request. The response communicated over the wireless link is the next in line response in the queue particularly associated with handheld computer 140 (step 340).

For example, a user of handheld computer 140 may begin a remote banking application on handheld computer 140. The user may wish to transfer money from a checking account to a savings account. In such a situation, the request to produce such a transfer would be placed in queue 146 of handheld computer 140. When a wireless link to carrier network 135 is established, the request, if next in line in queue 146, is communicated over the wireless link to message-queue middleware server 130 via carrier network 135. Message-queue middleware server 130 would then communicate such a request to a banking server such as a server 120 over communications network 110. The banking server would then make the appropriate transfer of funds and then communicate that the transfer has been completed or request further information from handheld computer user 140 by sending the message back to message-queue middleware server 130. If, in the meantime, the wireless link between handheld computer 140 and message-queue middleware server 130 has been broken either intentionally or unintentionally, the message received from banking server 120 would be put into queue 132 particularly associated with handheld computer 140 and held there until a communications link is re-established. Once a communications link is re-established, message-queue middleware server 130 begins providing any messages in queue 132, particularly associated with handheld computer 140, over the wireless link to handheld computer 140. Message-queue 132 being emptied would include the confirmation or request for further information that was previously received from banking server 120.

In contrast, in a synchronous communications system, once the communications link is broken, a new link would have to be re-established and the banking application and request would have to be restarted anew whereby the handheld computer user would have to reformulate and reinitialize the funds transfer.

While the detailed drawings, specific examples, and particular formulations given describe exemplary embodiments, they serve the purpose of illustration only. The hardware and software configurations shown and described may differ depending on the chosen performance characteristics and physical characteristics of the computing devices and communications networks. For example, the type of computing device, communications network, or devices used may differ. The methods and systems shown and described are not limited to the precise details and conditions disclosed. Furthermore, other substitutions, modifications, changes, and omissions may be made in the design, operating conditions, and arrangement of the exemplary embodiments and steps of the exemplary embodiments without departing from the scope of the invention as expressed in the appended claims.

What is claimed is:

1. A method of communicating with a communications network between a mobile device, a message-queue middleware server, and a plurality of servers, the message-queue middleware server, comprising:

establishing a wireless link from a mobile device;

retrieving a request from the mobile device, the request including a server address and quality of service information conditions;

sending the request over a communications network to the server corresponding to the server address;

retrieving information from the server corresponding to the server address;

placing the information from the server corresponding to the server address into a queue corresponding to the mobile device;

awaiting a wireless link to the mobile device;

checking the quality of service information conditions;

automatically deleting the information from the server if the quality of service information conditions are violated; and sending the information from the queue over the wireless link to the mobile device.

2. The method of claim 1, wherein the queue corresponding to the mobile device is maintained on a gateway server.

3. The method of claim 1, wherein the queue corresponding to the mobile device is maintained on a wireless service provider server.

4. The method of claim 1, further comprising:

retrieving a second quality of service associated with the information from the server corresponding to the server address.

5. The method of claim 4, further comprising:

deleting information from the queue based on the second quality of service.

6. The method of claim 1, wherein the request includes an address, and a function.

7. The method of claim 6, wherein the request further includes data.

8. The method of claim 1, further comprising:

retrieving a plurality of packetized messages from a message queue on the mobile device.

9. A communications system configured for communications between a mobile device, a message-queue middleware server, and a plurality of servers, the communications system, comprising:

an electronic device configured to send and receive wireless communications signals;

a message-queue server configured to communicate over a wireless link with the electronic device; and a communications network in communication with the message-queue server, wherein the message-queue server is configured to maintain a message queue associated with the electronic device and is further configured to communicate information from the message queue over the wireless link during periods in which the wireless link is available and the message-queue server receives quality of service information associated with the information in the message queue and determines whether the information should be deleted based on the quality of service information and the status of the wireless link.

10. The communications system of claim 9, wherein the electronic device includes a cellular telephone transceiver.

11. The communications system of claim 9, wherein the electronic device is a handheld computer.

12. The communications system of claim 9, wherein the message-queue server is a wireless service provider server.

13. The communications system of claim 9, wherein the electronic device is configured to send a message to the message-queue server including an address, and a function.

14. The communications system of claim 13, wherein the message includes data.

15. The communications system of claim 9, wherein the communications network includes the internet.

16. The communications system of claim 9, wherein the communications network is a local area network.

17. The communications system of claim 9, wherein the electronic device is configured with a message queue and is configured to communicate information from the message queue over the wireless link during periods in which the wireless link is available.

18. A method of communicating with a communications network using a wireless communications device, comprising:

establishing a wireless communications link with a message-queue server;

providing a request from a message queue maintained on the wireless communications device over the wireless communications link to the message-queue server;

providing a quality of service with the request; the quality of service being at least one of a time-to-live or a best effort quality of service;

re-establishing a wireless communications link with the message-queue server; and receiving a response over the re-established wireless communications link to the request from a message queue on the message-queue server if quality of service conditions were met by the re-establishment of the wireless communications link.

19. The method of claim 18, wherein in the request includes an address, and a function.

20. The method of claim 19, wherein the request includes data.

21. The method of claim 18, wherein the communications network includes the internet.

22. The method of claim 18, wherein the communications network is a local area network.

23. The method of claim 18, further comprising:

initiating a browser on the wireless communications device.

24. The method of claim 18, wherein the wireless communications device includes a cellular telephone transceiver.

25. The method of claim 18, wherein the wireless communications device is a handheld computer.

* * * * *